(12) United States Patent
Christensen et al.

(10) Patent No.: US 7,904,353 B2
(45) Date of Patent: Mar. 8, 2011

(54) METHOD AND SYSTEM FOR PROCESSING PAYMENTS

(76) Inventors: Mitchell T. Christensen, Livermore, CA (US); Daniel J. King, Lakeville, MN (US); Srinivasan Sangameswara, Rocklin, CA (US); Robert F. Crothers, Carmichael, CA (US); Paul T. Ortiz, Roseville, CA (US); Bruno O. Angelin, Oregon House, CA (US); Yuping He, Sacramento, CA (US)

( * ) Notice: Subject to any disclaimer, the term of this patent is extended or adjusted under 35 U.S.C. 154(b) by 948 days.

(21) Appl. No.: 11/787,834

(22) Filed: Apr. 17, 2007

(65) Prior Publication Data

US 2008/0262950 A1 Oct. 23, 2008

(51) Int. Cl.
  *G07B 17/00* (2006.01)
  *G07F 19/00* (2006.01)
(52) U.S. Cl. .......................... 705/30; 705/34
(58) Field of Classification Search .............. None
  See application file for complete search history.

(56) References Cited

U.S. PATENT DOCUMENTS

| | | | | |
|---|---|---|---|---|
| 4,205,780 A | * | 6/1980 | Burns et al. | 235/454 |
| 6,055,327 A | * | 4/2000 | Aragon | 382/138 |
| 6,438,527 B1 | * | 8/2002 | Powar | 705/40 |
| 7,209,897 B2 | * | 4/2007 | Ghiloni et al. | 705/40 |
| 7,412,418 B2 | * | 8/2008 | Erbey et al. | 705/40 |
| 7,546,275 B1 | * | 6/2009 | Herzberg et al. | 705/50 |
| 2006/0219773 A1 | * | 10/2006 | Richardson | 235/379 |
| 2007/0205262 A1 | * | 9/2007 | Bates | 235/379 |
| 2009/0204522 A1 | * | 8/2009 | Meyer et al. | 705/34 |
| 2009/0236413 A1 | * | 9/2009 | Mueller et al. | 235/379 |

* cited by examiner

*Primary Examiner* — F. Zeender
*Assistant Examiner* — Christopher Buchanan
(74) *Attorney, Agent, or Firm* — Paul R. Martin

(57) ABSTRACT

A payment processing method and system is described which involves serially processing remittance documents, e.g. financial instruments, remittances, and associated documents obtained from diverse sources, electronically scanning the financial instruments and other remittance documents, thereby converting the information contained thereon into a digital format. The digital information is passed through a series of software programs and associated hardware that read the scanned financial instruments, remittances, and other documents, and compares the information obtained with pre-existing information about the payor, detects errors, and the like automatically, with minimal human intervention. It also allows the information to be corrected and passed to a check encoding machine or process which imparts desired information on said checks before they are sent to a bank for deposit. The system is a plurality of electronically interconnected machines and computer servers having unique software programs installed therein, thereby allowing the remittances, financial instruments, and other documents to be processed automatically with a minimum of human interactions.

22 Claims, 1 Drawing Sheet

METHOD AND SYSTEM FOR PROCESSING PAYMENTS

SOFTWARE INDEX

A CD containing software programs used in the Method and System For Processing Payments of this invention is being filed concurrently herewith. The CD is entitled Rapid MS 110 Client/Server Source. It contains two software programs as follows:
1. Work Flow Manager Program
2. Intelligent Remittance Recognition Program The contents of the CD are incorporated by reference into this application.

BACKGROUND OF THE INVENTION

1. Field of the Invention

This invention relates to method of conducting business, and specifically to a method for processing payments obtained from diverse sources. In particular, it relates to a method and system for processing child support payments made by individuals or employers on behalf of individuals to a governmental or private entity for the purpose of satisfying child support obligations. The invention also encompasses a payment processing system which can be used by commercial entities to process payments received from multiple sources, and is specifically adapted to process child support payments made by individuals and employers on behalf of individuals to a central clearing organization which records and parses the payments, and sends out further payments that are made to custodial persons.

2. Prior Art

In 1975 Congress established the Child Support Enforcement Program with the passage of Title IV-D of the Social Security Act. There have been modifications made to the program over the years. As part of the Personal Responsibility and Work Opportunity Act of 1996, states were required to set up centralized payment processing sites, known as State Disbursement Units (SDUs), for the collection of child support payments. States are now required to receive support payments electronically and to disburse payments to custodial parents within two days of receipt. For large states this can amount to tens of thousands of payments per day. The payments come from individuals, and from employers who have withheld money from the employee's paycheck to satisfy the support obligations.

Private organizations have established business centers for the sole purpose of processing such payments on behalf of the states, and other interested parties. The private organizations have also developed systems for processing such payments, keeping track of amounts paid, and owed, and preparing checks or electronic payments for deposit at appropriate locations, whether it be to banks, or sent to individuals directly.

Almost without exception, up to now, the systems developed by the private organizations have been manually driven operations, and are susceptible to error. That is, while various machines and integrated software programs are used to process the checks, at some point human intervention is required which presents the usual opportunity for human errors to be made which render the payment data inaccurate to some degree. It has been estimated that up to 40% of child support payments made at the present time have errors of one sort or another that require human intervention to correct.

The present invention is a method and system for processing payments. It is specifically adapted to processing child support payments. The method and system substantially eliminates the need for human intervention, and renders the whole method of processing payments automatic from start to finish, thereby significantly decreasing the number of errors, and making the entire process more efficient than has heretofore been the case. The mechanism by which this is accomplished is the payment processing system of this invention. Thus, the invention is a method of processing support payments, and the system with which this is accomplished. The method and system described herein, applicable to child support payments, can also be used to process payments made for other purposes, such as catalog purchases, etc.

SUMMARY OF THE INVENTION

It is an object of this invention to provide a method and system for processing payments received from a variety of sources.

It is another object of the invention to provide a method for processing child support payments which is automatic and requires minimal human intervention.

It is a still further object of the invention to provide a system for processing child support payments which is entirely automatic, and requires minimal human intervention.

Other objects and advantages of the present invention will be apparent from the description below.

The foregoing and other objects are achieved by providing a method of processing child support payments which utilizes various hardware devices, and integrated software programs to take data from an image capture machine, automatically recognize payment remittances from any source regardless of the remittance document's format and/or layout, parse the remittance data, and correlate the remittance data with data extracted from an existing data store in order to validate the data obtained, identify the obligors identified on the remittance document, identify any processing errors, populate the database with the remittance data necessary for subsequent processing, and ultimately apply the payment to the appropriate debt or account.

The combination of hardware and software by which the method is carried out comprises the payment processing system of the invention.

DETAILED DESCRIPTION OF THE INVENTION

Figure 1:
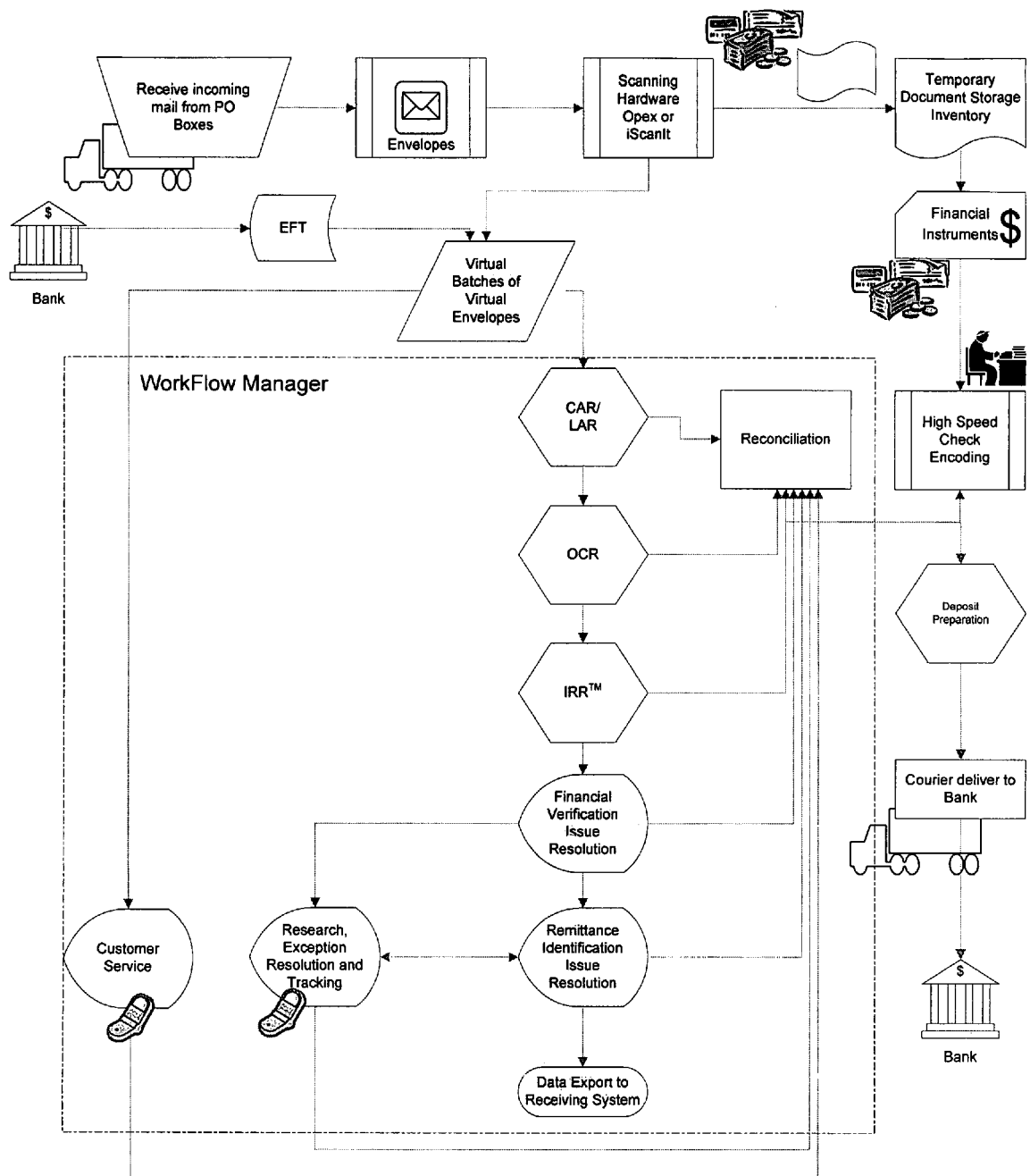
FIG. 1 is a schematic flow chart showing the various workflow steps utilized in the payment processing method and system of the invention.

As stated above, the method and system of the invention can be used for processing any kind of payments received from multiple sources, and channeled through a central source for processing. It is particularly suited, however, for processing child support payments. The method and payment processing system of the invention can thus be better understood with reference to FIG. 1. FIG. 1 shows the workflow steps of the method of the invention.

As seen in FIG. 1, the first step in the process of the invention is to accumulate a quantity of mail from various sources. Normally the mail is accumulated from post office boxes and the like, and generally is in the form of envelopes containing checks or other forms of payment such as money orders. The envelopes and the contents of the envelopes, including checks and other correspondence, if any, are called remittance documents. As used herein, the term "remittance" refers to a paper listing the number of payments contained in the envelope, the amounts of each, and the identification of the payor on whose behalf the payment has been made.

After the envelopes are collected, they are placed in a scanning machine that automatically opens the envelopes, and scans the envelopes and contents, including checks and remittances and other documents. This step is typically accomplished using an OPEX AS 3690(i) color scanning machine, manufactured by the OPEX Corporation, 305 Commerce Drive, Morristown, N.J., 08057. The OPEX machine is a high speed color scanner having a variety of functions. In just one step, the OPEX machine and the machine operator can open, extract, identify as to document type, capture images and metadata, print an audit trail, and output mail content.

During the scanning step, the financial instrument (FI), i.e. check, money order or other payment means, can be sprayed, if desired, with identifying information and an interim restrictive endorsement. Each envelope's set of images, that is, the contents of the envelope and the envelope itself, are indexed together and stored to a file system by a real time interface for further processing. This process takes the contents of real envelopes to a digital state, which is referred to as a "virtual envelope." The paper financial instruments (FI) are temporarily stored at another location for later processing.

Once a predetermined number of virtual envelopes have been captured, a corresponding virtual batch is created by the OPEX machine. All of the virtual envelopes within the batch are permanently indexed to the virtual batch. The batch size is user specified and can range from 1 to thousands of virtual envelopes. Once the predetermined virtual batch size is reached, the batch is automatically completed by the OPEX AS 3690(i) machine, and a new batch is started. The process of passing the documents through the scanner converts them into a virtual environment where workflow distribution occurs, and where every action taken with regard to a document is tracked and auditable. No paper leaves the mailroom unless going to storage or deposit preparation. Data can also be received at this stage and added to the batches of virtual envelopes from other sources such as an employer or a bank, through electronic file transfer means.

The virtual envelopes within the virtual batches are the substance of the work to be performed. The virtual batches provide for an important control mechanism and reporting function, but the method and system of the invention keeps track of the processing of each and every envelope through the system from the moment it is received until it is transferred to the CSE (child support enforcement) system, or other receiving entity.

After a batch is completed, either on the OPEX scanner, other scanner interface, or electronically transferred from an external entity, it is sent electronically (digitally) to what is designated a WorkFlow Manager. The Workflow Manager is a software program (Program #1 on the CD filed herewith) installed in associated computer hardware that is responsible for directing and controlling the processing of virtual envelopes through the system to completion. The WorkFlow Manager, represented by the dotted lines in FIG. 1, is a true envelope based system providing for all work to be processed at the virtual envelope level, including reconciliation and deposit preparation. The WorkFlow Manager software program is incorporated by reference herein.

The beginning of the workflow management starts with processing the Financial Instrument (FI). The Financial Instrument is a check or other negotiable item, such as a money order, treasury check, electronic fund transfer, etc. The scanned Financial Instrument is electronically transmitted to a computer server having check reader software installed therein (CAR/LAR in FIG. 1). The preferred software is A2iACAR/LAR software (sold by the A2IA Corp., 584 Broadway, Suite 810, New York, N.Y. 10012, USA). The software is capable of analyzing, extracting and reading all the information on the Financial Instument (check) and releasing it as electronic digital data. This includes the payee name, presence or absence of a payor's signature, date, CAR (Courtesy Amount Recognition), LAR (Legal Amount Recognition) and ABA Routing Number and Account Number based on the MICR (magnetic ink character recognition) information on the financial instrument. Other software programs with the same capabilities can be used. Once this check reader process is complete, the image of the Financial Instrument can then be presented on a computer screen via a local network to an individual responsible for processing the Financial Instrument along with the data entry fields pre-populated from the output of the CAR/LAR software, if any issues were encountered with the check. If no issues were encountered, the financial instrument transaction can be systemically completed, requiring no human intervention. This is represented by the block entitled Financial Verification Issue Resolution in FIG. 1. The operator then resolves the issues, or performs any additional data entry that might be required. The issues that may arise, and require resolution include such matters as: blank or incorrect payee, post-dated negotiable documents, stale-dated negotiable documents, the absence of a signature, foreign currency, etc. Additional information is captured and stored on a profile database maintained on the same or a separate server: this information includes the name, address and phone number of the maker on the FI, and the ABA Routing and Account Number as found on the MICR data at the bottom of the Financial Instrument.

Once the Financial Instrument (FI) has been passed through the Financial Instrument verification process i.e., CAR/LAR check reader, the scanned remittances are directed by the Workflow Manager software program to be processed by optical character recognition (OCR) software, installed on the same or a separate server. The OCR Software extracts the data from the scanned images of the remittances. The preferred software program used for this purpose is OmniPage 15, Capture SDK, a software program sold by the Nuance Corp., 1 Wayside Road, Burlington, Mass. 01803, USA. Nuance Corp. was formerly known as Scansoft. Other software programs with the same capabilities can be used.

The output from the OCR processing is then forwarded electronically to the same or a different server having the Intelligent Remittance Recognition (IRR) software, a core program utilized in the method of the invention, installed on it (Program #2, on the CD filed concurrently herewith). This program is described in greater detail below. It interprets and validates the extracted data from the remittances and other documents in the virtual envelope against data maintained on the same or a separate server (called the Positive File), to validate information on the payors and their payment amounts listed on the remittance. Every remittance is read from corner to corner, and automatically identifies the payment transactions. As used herein, the term Positive File refers to a data base containing previously existing information about the payor, his or her obligations, names, addresses, phone numbers, etc.

The Intelligent Remittance Recognition software program used in the method and system of the invention interprets, validates and populates the data entry fields from non-standard remittances directly without the necessity of barcode, templating, "rubber banding" or "roping and zoning". With the Intelligent Remittance Recognition software, a non-standard employer remittance with 100 or more payors may take no more worker's time than a remittance with a single payor.

The IRR software is installed on a server, and is accessible by other computers in the workflow distribution network.

In addition to identifying payment transactions, IRR also applies other predefined business rules. These can be as simple as matching special posting instructions to a participant or payment account, to the more complex such as identifying remittances that have key terms (e.g. Lien, Bond, Refund, etc.) which require special processing, or to automatically using data from the memo line of a check to attempt to identify the payment when there is no remittance. These rules are system wide and are configured to individual business needs.

Once IRR is finished applying its logic as a server based process, if there are any issues with the virtual envelope's remittance, the remittance image is presented to an operator for Remittance Identification Issue Resolution, along with pre-populated data entry fields, and a specific description of and location of each issue that needs to be addressed. The operator resolves any issues and enters any additional data that might be required. Once all issues have been resolved, the transaction is complete, and the data can be exported to a Receiving System. If no issues are identified by IRR, the envelope is completed without human intervention.

The Workflow Manager software program moves the virtual envelope throughout this entire process to ensure separation of duties. Users are prohibited from touching an envelope more than once within the entire workflow and are prohibited from modifying their own payments.

At various stages in the process, human operators, represented in FIG. 1 by the Financial Verification Issue Resolution, and Remittance Identification Issue Resolution blocks, are available to reconcile data obtained in the real time process with previously stored data, in order to make corrective inputs. The operators are connected to the processing machines and software programs through local area networks.

On occasion, a problem may require substantial research effort in order to correct. Thus the issue is referred to the Research, Exception Resolution and Tracking office which interconnects the Financial Verification Issue Resolution and Remittance Identification Issue Resolution efforts.

Once the data has been passed through or operated on by the Financial Verification software software, the actual paper financial instruments (checks, money orders, etc.) previously stored elsewhere (Temporary Document Storage Inventory), are sent to an encoding device (High Speed Check Encoding). This is the stage where all negotiable payments are encoded in accordance with industry standards. The system supports electronic encoding and endorsement consistent with Check 21 Federal Legislation capabilities for encapsulating the images and metadata into standard file formats as described by American National Standards for Financial Institutes X9.37 Specifications for Electronic Exchange of Check and Image Data.

Suitable encoding hardware is manufactured by the Unisys Corp, Unisys Way, Blue Bell, Pa. 19424, USA, under the name NDP 200. The machine is part of the Unisys Quantum Series, which provide onsite scalability from 130 to 600 FIs per minute. The steps in the encoding process are well known and will not be further detailed herein.

During the workflow processing, some items will be identified as needing to be rejected and returned to the maker of the financial instrument. Reasons for rejects include misdirected payment or a prior NSF (not sufficient finds) check history. Rejected items are sorted to a separate bin or queue during the encoding process and returned to the maker of the original financial instrument with a letter of explanation. The Workflow Manager software supports the use of a standard form letter template to provide an explanation to the maker of the reason for the returned item.

The payment processing method and system of this invention minimizes unidentified payments by scrutinizing all payments received, using IRR and customer-specific processing rules and following standard SDU quality assurance practices. This provides the highest quality throughout possible.

The objective of the system is to resolve the maximum number of payments automatically with minimal human intervention. The further objective is to resolve the maximum number of exceptions and issues during initial review by a single human intervention. Any time a telephone number is available via the image or on file, research will focus on resolution through a direct phone contact.

Staff tasked with resolving the issue focus on the root cause of the problem causing additional research. In some instances the research process becomes an extension of outreach, providing findings that can be used to improve overall performance.

The method and system of this invention uniquely supports the research process by grouping all known issues from a particular maker of the financial instrument or check writer together when presenting to the operator for research. This allows a single operator to make one telephone call and resolve issues that can affect multiple envelopes, maximizing the efficiency and efficacy of the resolution process and reducing the impact on the check writer by reducing the number of calls received.

The payment processing method and system of this invention approach to correcting data enhances the methodology for verifying the accuracy of collections data to avoid errors leading to unidentified or misapplied payments. If the data provided is accurate the system will post it accurately. If the data provided is inaccurate or incomplete, the system will prompt an operator to correct the data so that the existing payment can be identified. If there is insufficient information for the operator to process, the payment is directed through exception processing where staff makes the necessary contacts to obtain the data for completion of the payment.

The method and system of this invention includes Aged Exception processing capabilities for tracking, updating, and resolution of unidentified payments. Aged Exceptions processing leverages the functionality of the system and complements the efforts for resolving unidentified payments on the CSE system. All exceptions, including Aged Exception, follow the same workflow model, providing uniform, consistent functions and capabilities.

The Aged Exception system tracks unidentified payments, with their associated data and images. The Aged Exceptions process uses the operational database to apply customer-specific processing rules needed for tracking and resolving unidentified payments. Exceptions are prioritized to ensure all aged unidentified payment are continually researched until such time as they are transferred to the CSE system or refunded to the maker of the check.

The payment processing method and system of this invention provides all collections exceptions processing, including non-sufficient funds (NSFs) returned items; payments received from those with prior NSF payment, or: those that are unacceptable for deposit such as counterfeits, and forgeries. These exception processes follow similar workflows including any necessary generation of correspondence.

The method and system of the invention incorporates reconciliation at multiple points in the processing flow. Reconciliation occurs primarily at the envelope level, with cross references at the batch and system levels, multiple times during each day. Current cumulative views are displayed prior to deposit, prior to transmitting data to the CSE system and the next day's deposit verification. Five primary data points are used to support the reconciliation and control process. These are:

The Envelope Financial Instrument Amount (Each validated financial instrument dollar amount)

The Envelope Remittance Dollar Amount (Sum of all identified payments from remittance within envelope)

The Batch Financial Instrument Item Count (Total number of financial instruments in batch)

The Batch Financial Instrument Dollar Amount (Sum of all verified financial instrument in batch)

The Batch Remittance Dollar Amount (sum of all identified payments of all Remittance in batch)

The method and system of this invention provides built in controls and reconciliation by comparing:

Batch FI Number total to Batch Financial Instrument Number Total—

At the conclusion of FI Verification processing, the method and system of the invention has established the dollar amount for each item that sum to a batch total. At this point the number of financial instruments totaled in a batch is compared to the original batch FI count of financial instruments received. All input sources provide a batch item count of the total number of financial instruments, remittance, correspondence, and envelopes included in the batch. For this first financial reconciliation, the method and system of the invention utilizes the financial instrument count as the baseline reconciliation point to establish that all financial instruments that were received have been processed through Financial Verification and the amount of the financial instrument has been captured and verified. This first control point helps to ensure that all items included in the system have been received and properly assessed for accurate dollar amount. The system does an electronic comparison and verifies the batch financial instrument count. If the batch does not reconcile to the number of financial instruments, the system identifies the batch for review.

Envelope Financial Instrument Total to Envelope Remittance Total—

During Financial Verification, the system establishes an amount for all FIs. As each envelope remittance is processed, the system compares the FI amount totals to the envelope remittance amount totals generated via IRR and any manual entries made by operators. The remittance amount must equal the FI amount in order for the envelope to be completed. If the amounts do not reconcile the system will identify the envelope for review.

Batch Financial Instrument Total to Batch Remittance Total—

At the conclusion of remittance identification processing, the method and system of the invention has established a separate remittance amount for all remittances. As each remittance is processed, the system does an electronic comparison of the financial instrument amount totals from the amount entry process to the envelope remittance amount totals from the payment identification process. These items and amounts are rolled up into batch totals. If either the financial instrument or remittance totals for the batch do not reconcile, the method and system of the invention will identify the batch for review.

Prior to Deposit and Prior to File Transfer to the CSE System

Deposit Summary to Export Summary—At the conclusion of the deposit preparation, a deposit summary including batch and financial instrument amount details is established. This summary is compared to the system's export summary that includes batch, financial instrument, and total payment transaction among detail information. The system reconciliation manager and deposit preparation staff compare these amounts.

Upon Receipt of Bank Deposit Information

The Deposit Summary is verified against Next Day Bank Deposit Info—Accounting staff perform a comparison of the expected and actual deposit credit received to provide the final reconciliation of the previous day's work.

The payment processing method and system of this invention provides for a parallel workflow which allows for special tasks (e.g. correspondence) to occur without affecting the flow of payment processing. A majority of the work occurs at the server level, with PC interaction only required for staff to resolve issues identified by the software.

The payment processing method and system of this invention was developed from the ground up to solve the dilemmas confronting child support payment processing. A major problem in properly identifying child support payments is the lack of standardization of formats of remittance information. The method and system of this invention, was designed to solve this problem and offer States a high speed, highly compliant entity, a revolutionary integration of hardware and image-based workflow software. It takes full advantage of new technology to reduce the number of manual processes, decrease the risk of theft, increase accountability, and tighten system controls. At the same time, it decreases the overall need for human resources, improves worker efficiency, ensures separation of duties, and supports a flexible work distribution. The method and system of the invention brings a new paradigm to allow payment process operations to realize their full potential.

A central feature of the method and system of this invention is its ability to recognize payment remittances, parse the remittance data and correlate the remittance data with data extracted from the target system such as CSE application (i.e., the positive File) in order to validate the obligors identified on the remittance document. Intelligent Remittance Recognition (IRR) software enables the application to automatically recognize any remittance document's data elements regardless of the remittance document's format and/or layout. The format of a remittance document is not specified by an SDU, so the IRR system must recognize and interpret virtually any remittance format—without manual user intervention or training.

The goal of the Intelligent Remittance Recognition rules engine is to extract the provided data from the OCR output of the remittance document images(s), validate that data using the positive file, identify any processing errors and then populate the database with the remittance data necessary for subsequent display processing.

That program is set forth in the CD deposited concurrently herewith in the U.S. Patent Office. It can be used in conjunction with a conventional PC computer, or Macintosh, or other computers using the same operating systems. The program is essentially a rules engine that extracts data presented to it obtained from an optical character recognition program, processes that information, identifies any processing errors, corrects the data if necessary, and then passes it on to the next instrumentality in the payment system. The IRR program is incorporated herein by reference.

As seen in FIG. 1, the payment processing system of this invention comprises a plurality of machines and computers having programs installed therein which are interconnected electronically, and capable of passing data to one another. The first device in the payment processing system of the invention is a document scanning machine which is capable of scanning checks and other remittance documents passed through it. The machine of choice is an OPEX AS 3590(i) machine, described above, although others with like capability can be used. The output of the machine is accumulated as a virtual envelope, and a predetermined quantity of virtual envelopes are accumulated into a batch.

As also shown in FIG. 1, the second machine of the payment processing system is a computer server having the A2iA CAR/LAR check reader software program loaded thereon. The CAR/LAR software program accepts the data packets or batches from the scanning machine, and reads the Financial Instruments to capture information, detect errors, etc.

After the data is processed by the CAR/LAR software program installed in the server, it is passed to a server having the optical character reading program installed on it (OCR), the third component of the system. This program reads the data on remittances other than the financial instruments.

The data from OCR is then passed to a computer server with the intelligent remittance recognition software program (IRR) installed thereon. This program can be installed on the same or another server as the A2iA software. Thus, the server having the IRR software program installed thereon becomes the fourth component of the payment processing system of the invention. As discussed above, the IRR software program is a rules engine that extracts the provided data from the OCR output of the remittance document images(s), validates that data using the positive file, identifies any processing errors and then populates the database with the remittance data necessary for subsequent processing.

The data packets are next passed to the fifth component of the payment processing system of the invention, a computer server having an online application with software specifically designed for reviewing payments, resolving exceptions and reconciliation processes installed thereon. At this stage, modifications are made to the information in the data packets, if necessary, by operators in real time on computers who have access to the information accumulated in the system after its digitalization. That is, they have access to the data generated by the CAR/LAR software program, and the IRR software program and subsequently stored in the database for additional processing. The information, including any modifications made thereto, is passed to the child support enforcement (CSE) system, and to a high speed check encoding machine, or electronic process, for encoding information on checks or other financial instruments that have been stored temporarily, and are now processed through the machine. The encoding machine or process thus becomes another component of the payment processing system of the invention. The preferred encoding machine is manufactured by the Unisys Corp, Unisys Way, Blue Bell, Pa. 19424, USA, under the name NDP 200. The machine is part of the Unisys Quantum Series, which provide onsite scalability from 130 to 600 financial instruments per minute. Other encoding machines with similar capabilities can be used. Electronic encoding and endorsement with Check 21 capabilities for encapsulating the images and metadata into standard file formats as described by American National Standards for Financial Institutes X0.37 Specifications for Electronic Exchange of Check and Image Data is available and preferred for clients banking with Check 21 compliant banks.

After the Financial Instruments are encoded, they are passed to a deposit preparation unit, and ultimately delivered to a bank for issuance of payments to the custodial party.

It will be understood by those skilled in the art, that while the Method and System of the invention has been described in terms of a Method and System for processing child support payments, the same method and system can be used for other like applications which involve accumulating checks or other forms of financial instruments from a variety of sources, processing the checks, and depositing sums of money to specific accounts and communicating via electronic or physical means the specificity of receipts to a client system of accounts receivable and/or obligations owed.

We claim:

1. A method of processing child support payments which comprises:
   a. collecting a quantity of envelopes containing remittances, paper financial instruments, and associated documents,
   b. passing said envelopes, remittances, paper financial instruments and associated documents through an electronic scanner, and converting the information contained therein into electronic virtual envelopes, wherein each envelope's images are indexed and stored to a file system by a real time interface, and
   c. accumulating a predetermined number of virtual envelopes sufficient to comprise a virtual batch, and
   d. forwarding the data from the virtual batch of virtual envelopes to a server on which is installed a workflow manager software program that is responsible for directing the virtual envelopes through the system for completion, and
   e. forwarding the images of financial instruments from the batch of virtual envelopes to a server having a financial instrument software program installed therein, which program reads the data appearing on the financial instruments, and
   f. forwarding the images of the remittances in the virtual envelopes to a server having an optical character reading program installed in it, which program reads and extracts the data from the images of the remittances, and
   g. forwarding the data from the optical character reader to a server having an intelligent remittance recognition software program installed therein, which software program further parses the data, comparing the data obtained from the intelligent remittance recognition software program with data from a pre-existing positive data bank to validate and identify payments listed in the remittances, and identify errors in the remittances, and
   h. forwarding the output data from said intelligent remittance recognition software program to a server upon which is installed an online application containing software specifically designed for and having means for inputting information from other sources to resolve issues discovered by the financial instrument validation and intelligent remittance recognition software, and
   i. exporting the output data from the server containing data repository to the child support enforcement entity, and to a check encoding machine or process for encoding information on the paper financial instruments, and
   j. preparing deposits for transmission to a client bank.

2. The method of claim 1 wherein the means of inputting information from other sources in subparagraph (h) is a computer operationally connected to said online application containing software specifically designed for and being operated by an individual in real time who inputs corrected data on said online application.

3. The method of claim 1 wherein said optical character reader of (f) is a software program which extracts the data from the scanned images of the remittances.

4. The method of claim 1 wherein said workflow manager software program of subparagraph (d) monitors the operative steps set forth in subparagraphs e, f, g, h, i, and j thereof.

5. The method of claim 1 wherein said intelligent remittance recognition software of subparagraph (g.) interprets, validates and populates data entry fields from remittances without the necessity of bar codes, and applies other pre-defined business rules.

6. The method of claim 1, wherein after said deposits are prepared for transmission to a client bank, the deposits are physically or electronically conveyed to said bank.

7. The method of claim 1 wherein the check encoding machine of subparagraph (i) encodes and organizes checks.

8. The method of claim 1 wherein the information obtained in step (g) is validated by sending the information through a local area network to a computer server containing a positive file being operated in real time, and comparing the information obtained in said step with the information in the positive file, and making any necessary corrections.

9. The method of claim 1 wherein information is sent to said workflow management software from sources other than obtained from said envelopes, said information including electronic files from employers, banks, and other sources of financial information, and such information is integrated into said virtual envelopes.

10. The method of claim 1 wherein in step (b), said paper financial instruments are sprayed with identifying information and a temporary restrictive endorsement.

11. A payment processing system comprising:
a. a scanning machine for converting envelopes, financial instruments, remittances and other paper based written material into a digital format, said scanning machine creating a virtual envelope available for further processing and accumulating a predetermined number of virtual envelopes into a virtual batch,
b. a computer server having software means installed therein for tracking the processing of each virtual envelope through the system from the moment it is received from the scanner until it is transferred to a structured client accounts receivable system, wherein said software means reads the data from a virtual envelope, and presents it to the individual responsible for processing the financial instruments along with the data entry fields pre-populated from the output of the software means if any issues are encountered with the financial instrument,
c. a computer server having optical character reading software installed thereon for the specific purpose of reading and processing data contained on digitized financial instruments,
d. a computer server having a software program installed therein that permits an operator to resolve issues encountered with the financial instrument, and to perform any additional data entry that might be required,
e. a computer server having optical character reading software installed thereon for the specific purpose of capturing data contained on digitized documents other than financial instruments,
f. a computer server having intelligent remittance recognition software program installed therein,
g. a computer server having software means for capturing and storing other pertinent information on a database,
h. a computer server having software installed therein which allows modifications to be made on the computer screen in the data being passed to it,
i. a financial instrument encoding machine or electronic process that accepts data being presented to it from a computer server and encodes desired information on the financial instruments,
j. means for preparing deposits from said encoded financial instruments, and
k. means connecting each of the individual devices of subparagraphs (a) through (i) above electronically, so that data can be passed back and forth between them.

12. The system of claim 11 wherein the means for tracking the processing of each virtual envelope set forth in (b), is a software program that monitors the operative steps set forth in subparagraphs e, f, g, h, i, j, and k thereof.

13. The system of claim 11 wherein the software program set forth in (f) interprets, validates and populates data entry fields from non-standard remittances without the necessity of bar codes, and applies other predefined business rules.

14. The system of claim 11 wherein said remittance data is modified utilizing a computer operationally connected to said online application containing software specifically designed to allow an individual in real time to correct remittance data on said online application.

15. The system of claim 11 wherein said scanner of (a) automatically opens the envelopes and scans the contents of the envelopes including checks, remittances, and other documents.

16. The system of claim 11 wherein said optical character reading program of (e.) extracts the data from the scanned images of the remittances.

17. The system of claim 11 wherein the check encoding machine of (i) encapsulates the images and meta data into standard file formats.

18. The system of claim11 wherein the financial instrument reading machine of (c) contains a software program which analyzes, extracts, and reads all information on the financial instrument and releases it as electronic digital data.

19. The system of claim 11 wherein said encoding machine of (i) encodes specific desired information on the financial instruments.

20. A method for processing payments which comprises:
a. collecting a quantity of envelopes containing remittances, paper financial instruments, and associated documents,
b. passing said envelopes, remittances, paper financial instruments and associated documents through an electronic scanner, and converting the information contained therein into electronic virtual envelopes, wherein each envelope's images are indexed and stored to a file system by a real time interface, and
c. accumulating a predetermined number of virtual envelopes sufficient to comprise a virtual batch, and
d. forwarding the data from the virtual batch of virtual envelopes to a server on which is installed a workflow manager software program that is responsible for directing the virtual envelopes through the system for completion, and
e. forwarding the images of financial instruments from the batch of virtual envelopes to a server having a financial instrument software program installed therein, which program reads the data appearing on the financial instruments, and
f. forwarding the images of the remittances in the virtual envelopes to a server having an optical character reading program installed in it, which program reads and extracts the data from the images of the remittances, and
g. forwarding the data from the optical character reader of (f) to a server having an intelligent remittance recognition software program installed therein, which software program further parses the data, comparing the data obtained from the intelligent remittance recognition software program with data from a pre-existing positive data bank to validate and identify payments listed in the remittances, and identify errors in the remittances, and h. forwarding the output data from said intelligent remittance recognition software program to a server upon which is installed an online application containing software specifically designed for and having means for inputting information from other sources to resolve issues discovered by the financial instrument validation and intelligent remittance recognition software, i. exporting the output data from the server containing data repository to a client entity, and to a check encoding machine or process for encoding information on the paper financial instruments, and j. preparing deposits for transmission to a client bank.

21. The method of claim 20 wherein said software program of (d) monitors the operative steps set forth in subparagraphs e, f, g, h, i, and j thereof.

22. The method of claim 20 wherein said software program of (g) interprets, validates and populates data entry fields from non-standard remittances without the necessity of bar codes, and applies other predetermined business rules.

* * * * *